United States Patent [19]

Steinbeck et al.

[11] Patent Number: 4,783,195
[45] Date of Patent: Nov. 8, 1988

[54] PROCESS FOR THE PREPARATION OF A CONCENTRATED AQUEOUS REACTIVE DYESTUFF SOLUTION: TRIPHENYL-DIOXAZINE DYES, LITHIUM SALTS

[75] Inventors: Werner Steinbeck; Wolfgang Harms, both of Leverkusen, Fed. Rep. of Germany

[73] Assignee: Bayer Aktiengesellschaft, Leverkusen, Fed. Rep. of Germany

[21] Appl. No.: 146,885

[22] Filed: Jan. 22, 1988

[30] Foreign Application Priority Data

Feb. 7, 1987 [DE] Fed. Rep. of Germany ....... 3703732

[51] Int. Cl.$^4$ .................... C09B 62/503; C09B 19/02; D06P 1/384; D06P 3/66
[52] U.S. Cl. ............................................. 8/527; 8/549; 8/680; 8/688; 8/918; 8/937; 544/75; 544/76
[58] Field of Search ........................ 8/527, 549; 544/76

[56] References Cited

U.S. PATENT DOCUMENTS

| | | | |
|---|---|---|---|
| 3,883,523 | 5/1975 | Parton | 544/76 |
| 3,892,742 | 7/1975 | Parton | 544/74 |
| 4,577,015 | 3/1986 | Jager et al. | 8/657 |
| 4,578,461 | 3/1986 | Jager | 8/657 |

FOREIGN PATENT DOCUMENTS

| | | |
|---|---|---|
| 1353604 | 5/1974 | United Kingdom . |
| 1368158 | 9/1974 | United Kingdom . |
| 2019872 | 11/1979 | United Kingdom . |
| 1559752 | 1/1980 | United Kingdom . |
| 2059985 | 4/1981 | United Kingdom . |

Primary Examiner—A. Lionel Clingman
Attorney, Agent, or Firm—Sprung Horn Kramer & Woods

[57] ABSTRACT

A process for the preparation of a concentrated storage-stable aqueous solution of the dyestuff of the formula

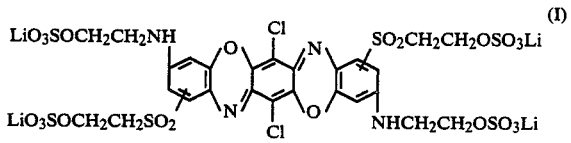

is characterized in that the reaction mixture obtainable from the quinone derivative of the formula

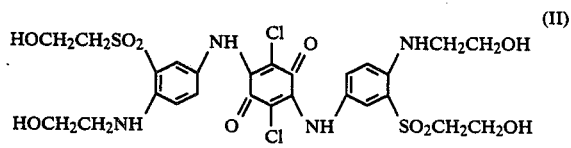

by sulphation and subsequent oxidation cyclization, preferably with ammonium, sodium or potassium peroxodisulphate, in oleum is diluted with water or sulphuric acid to a sulphuric acid concentration of 37–50%, preferably 41–43%, and the product which thereby precipitates is separated off and brought to a pH of about 2–6, preferably 3–4, in water with basic lithium compounds, preferably lithium carbonate or lithium hydroxide.

9 Claims, No Drawings

PROCESS FOR THE PREPARATION OF A CONCENTRATED AQUEOUS REACTIVE DYESTUFF SOLUTION: TRIPHENYL-DIOXAZINE DYES, LITHIUM SALTS

The present invention relates to a process for the preparation of a concentrated storage-stable aqueous solution of the dyestuff of the formula

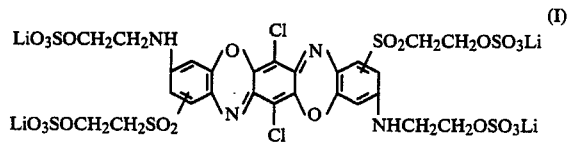

which is characterized in that the reaction mixture obtainable from the quinone derivative of the formula

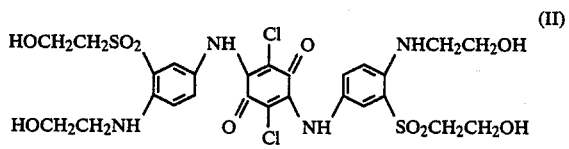

by sulphation and subsequent oxidative cyclization, preferably with ammonium, sodium or potassium peroxodisulphate, in oleum is diluted with water or sulphuric acid to a sulphuric acid concentration of 37–50%, preferably 41–43%, and the product which thereby precipitates is separated off and brought to a pH of about 2–6, preferably 3–4, in water with basic lithium compounds, preferably lithium carbonate or lithium hydroxide.

The dyestuff concentration in the oleum melt is in general 10 to 25% by weight.

The dyestuff concentration in the aqueous solution is in general about 15 to 20% by weight.

The oleum melt is preferably diluted with water by pouring the melt onto the appropriate amount of ice, with additional external cooling, and during this operation the temperature should preferably be less than 20° C.

If necessary, the solution can be clarified by the addition of customary clarifying agents, for example active charcoal.

The resulting solution is stable for a prolonged period in the temperature range from 0° C. to 50° C. and can be used directly for dyeing and printing cellulose materials.

EXAMPLE 1

60.0 g of the condensation product of chloranil and 3-($\beta$-hydroxyethylsulphonyl)-4-($\beta$-hydroxyethylamino)aniline of the formula

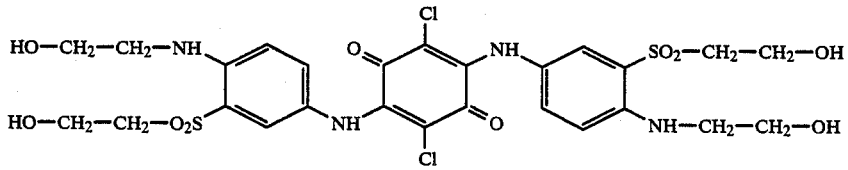

are introduced into 336 ml of 20% strength oleum at 20°–25° C. in the course of one hour, with cooling. To obtain a complete solution, the mixture is subsequently stirred for one hour. Thereafter, 46.8 g of potassium peroxodisulphate are added in portions at 20°–25° C. in the course of one hour, with cooling. After the reaction mixture has been subsequently stirred for one hour, it is poured onto 865 g of ice, with additional external cooling. The temperature during this addition should not rise above 20° C. After the mixture has been stirred for three hours, the dyestuff which has precipitated is filtered off with suction. The mother liquor containing 43% of $H_2SO_4$ contains only 2% of the dyestuff yield (extinction measurement). The suction filter cake (186 g) is stirred into 387 g of water and the mixture is brought to a pH of 3 to 4 with 43 g of lithium carbonate.

After 9 months at 20° C. or periods of 4 weeks each at 0° C. or 50° C., the dyestuff solution thus obtained (590 g) is unchanged. After appropriate dilution, the solution can be used for dyeing cotton by customary processes.

EXAMPLE 2

Instead of pouring the reaction mixture onto ice, as described in Example 1, 865 g of water are carefully added dropwise at 0°–5° C., with thorough cooling. The subsequent procedure is then as in the first example.

EXAMPLE 3

60.0 g of the condensation product of chloranil and 3-($\beta$-hydroxyethylsulphonyl)-4-($\beta$-hydroxyethylamino)aniline are introduced into 168 ml of 20% strength oleum at 20°–25° C., with cooling, and are dissolved. 41.2 g of sodium peroxodisulphate are then introduced at 20°–25° C., with cooling. The reaction batch is subsequently stirred at this temperature for a further hour and then poured onto 408 g of ice at a maximum temperature of 20° C., with additional external cooling. After the mixture has been stirred for three hours, the dyestuff which has crystallized out is filtered off with suction. The mother liquor has an $H_2SO_4$ content of 43%. The suction filter cake (180 g) is stirred in 263 g of water and the mixture is brought to a pH of between 3 and 4 with 42 g of lithium carbonate.

460 g of a storage-stable dyestuff solution result.

EXAMPLE 4

60.0 g of the condensation product of chloranil and 3-($\beta$-hydroxyethylsulphonyl)-4-($\beta$-hydroxyethylamino)aniline are introduced into 168 ml of 20% strength oleum at 20°–25° C., with cooling, and are dissolved. Thereafter, 39.5 g of ammonium peroxodisulphate are added in portions at 20°–25° C. The mixture is subsequently stirred for one hour. The batch is then allowed to run onto 920 g of ice/water at a maximum temperature of 15° C. 386 g of 96% strength sulphuric acid are added dropwise to the resulting dyestuff solution at 15°–20° C. After the mixture has been stirred overnight, the dyestuff which has precipitated is filtered off with suction. The mother liquor contains 42% of $H_2SO_4$. The suction filter cake (160 g) is brought to a pH of 3 to 4 in 350 g of water with 37 g of lithium carbonate.

The solution formed can be stored unchanged for several months at 0° C. to 25° C. or 4 weeks at 40° C.

What is claimed is:

1. Process for the preparation of a concentrated aqueous solution of the dyestuff of the formula

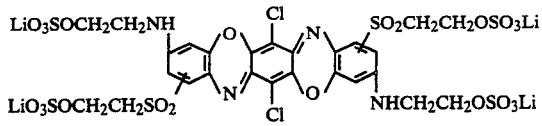

comprising sulfating the quinone derivative of the formula

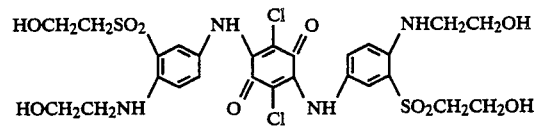

to obtain a sulfated product, oxidatively cyclizing the sulfated product in oleum to form an oleum melt, diluting the melt oleum with water or sulphuric acid to a sulphuric acid concentration of 37–50% and obtaining a precipitate, separating the precipitate, and forming an aqueous solution by adding the separated precipitate to water and bringing the pH of the aqueous solution to a pH of about 2–6 with basic lithium compounds.

2. Process according to claim 1, wherein the dilution of the cyclization reaction mixture is carried out to a sulfuric acid concentration of 41–43%.

3. Process according to claim 1, wherein the pH of the aqueous solution is brought to a pH of about 3–4.

4. Process according to claim 1, wherein the lithium compounds are lithium carbonate or lithium hydroxide.

5. Process according to claim 1, the dilution of the oleum melt takes place at a maximum temperature of 20° C.

6. Process according to claim 1 the dilution takes place by pouring the melt into ice.

7. Process according to claim 1, the oxidative cyclization takes place with ammonium, sodium or potassium peroxodisulphate.

8. Dyestuff solution, obtained according to the process of claim 1.

9. In a method a dyeing and printing cellulose materials, the improvement comprising dyeing and printing said materials with the concentrated aqueous dyestuff solution obtained according to the process of claim 8.

* * * * *

UNITED STATES PATENT AND TRADEMARK OFFICE
CERTIFICATE OF CORRECTION

PATENT NO. : 4,783,195

DATED : November 8, 1988

INVENTOR(S) : Werner Steinbeck, et al

It is certified that error appears in the above-identified patent and that said Letters Patent is hereby corrected as shown below:

| | |
|---|---|
| Abstract, line 7 | Delete "oxidation" and substitute --oxidative-- |
| Col. 1, line 58 | Beginning of formula delete "HO-CH$_2$-CH$_2$-NH" and substitute --HO-CH$_2$-CH$_2$-HN-- |
| Col. 4, line 13 | After "claim 1," insert --wherein-- |
| Col. 4, line 16 | After "cliam 1" insert --wherein-- |
| Col. 4, line 18 | After "claim 1," insert --wherein-- |
| Col. 4, line 26 | Delete "claim 8" and substitute --claim 1-- |

Signed and Sealed this

Twelfth Day of September, 1989

Attest:

DONALD J. QUIGG

Attesting Officer

Commissioner of Patents and Trademarks